United States Patent
Matsumura et al.

(10) Patent No.: US 10,684,667 B2
(45) Date of Patent: Jun. 16, 2020

(54) DYNAMIC BATTERY POWER MANAGEMENT BASED ON BATTERY INTERNAL IMPEDANCE

(71) Applicants: Naoki Matsumura, San Jose, CA (US);
Brian C. Fritz, Milpitas, CA (US);
Andy Keates, Los Gatos, CA (US);
Alexander B. Uan-Zo-Li, Hillsboro, OR (US)

(72) Inventors: Naoki Matsumura, San Jose, CA (US);
Brian C. Fritz, Milpitas, CA (US);
Andy Keates, Los Gatos, CA (US);
Alexander B. Uan-Zo-Li, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 67 days.

(21) Appl. No.: 15/719,431

(22) Filed: Sep. 28, 2017

(65) Prior Publication Data
US 2019/0094942 A1 Mar. 28, 2019

(51) Int. Cl.
*G06F 1/32* (2019.01)
*G06F 1/30* (2006.01)
*G06F 1/3212* (2019.01)
*G06F 1/3287* (2019.01)

(52) U.S. Cl.
CPC ............ *G06F 1/3212* (2013.01); *G06F 1/305* (2013.01); *G06F 1/3287* (2013.01)

(58) Field of Classification Search
CPC ....... G06F 1/3212; G06F 1/3287; G06F 1/305
See application file for complete search history.

(56) References Cited

U.S. PATENT DOCUMENTS

| | | |
|---|---|---|
| 2011/0077879 A1 | 3/2011 | Paryani |
| 2013/0307334 A1 | 11/2013 | Middleton et al. |
| 2014/0358459 A1 | 12/2014 | Trnka et al. |
| 2015/0119094 A1* | 4/2015 | Bartels .............. H04W 52/0261 455/518 |
| 2016/0077160 A1 | 3/2016 | Wampler et al. |

FOREIGN PATENT DOCUMENTS

KR 20170096409 8/2017

OTHER PUBLICATIONS

International Search Report and Written Opinion from PCT/US2018/048459 notified Dec. 7, 2018, 12 pgs.

* cited by examiner

*Primary Examiner* — Stefan Stoynov
(74) *Attorney, Agent, or Firm* — Green, Howard & Mughal LLP

(57) ABSTRACT

An apparatus is provided which comprises: a first circuitry to estimate variation of an internal impedance of a battery; a second circuitry to estimate a high power that the battery can supply for a first time-period, based on the estimated variation of the impedance of the battery; and a third circuitry to facilitate operation of one or more components of the apparatus in accordance with the estimated high power for the first time-period.

24 Claims, 7 Drawing Sheets

DYNAMIC BATTERY POWER MANAGEMENT BASED ON BATTERY INTERNAL IMPEDANCE

BACKGROUND

A battery-operated device may occasionally operate in an enhanced mode, e.g., a turbo boost mode, when voltage and/or frequency supplied to a processor may be relatively high. During such enhanced mode of operation, the device may draw relatively high power from the battery. It may be useful to optimize the amount power drawn from the battery during such enhanced mode of operation.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
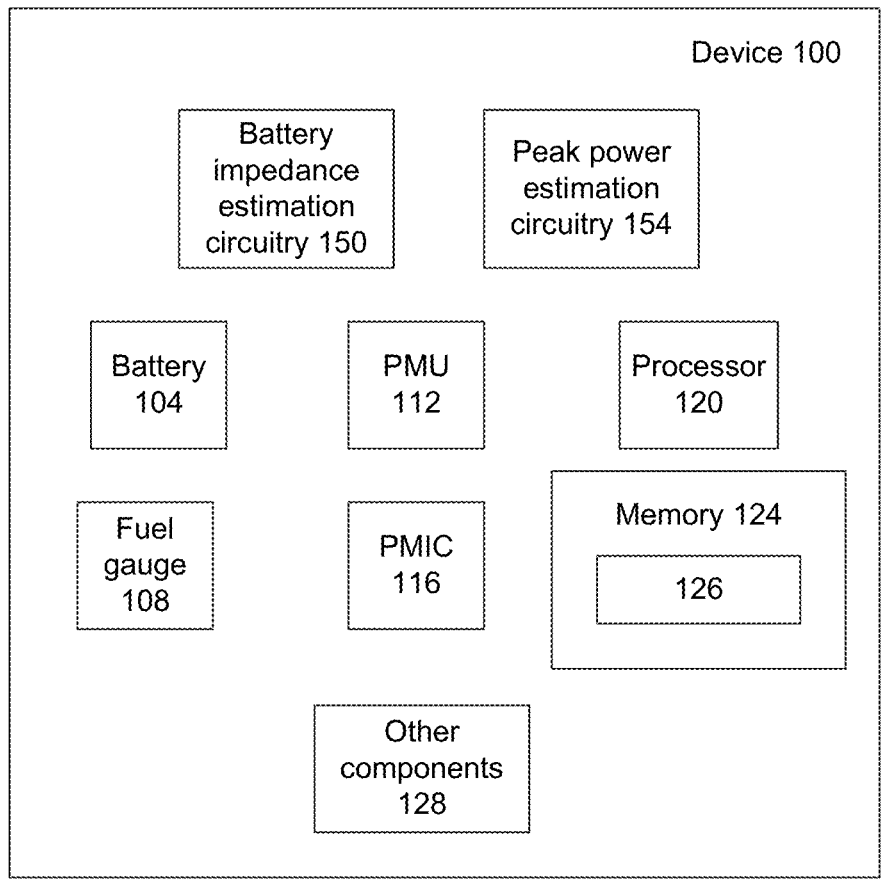
FIG. 1 illustrates a device that estimates peak power metrics based on estimating variation of internal impedance of a battery powering the device, according to some embodiments.

A battery-operated device may occasionally operate in an enhanced mode, e.g., a turbo boost mode, when a voltage and/or frequency supplied to a processor may be relatively high. During such enhanced mode of operation, the device may draw relatively high power from the battery. It may be useful to optimize the amount power drawn from the battery during such enhanced mode of operation.

For example, if too high power is drawn from the battery during the enhanced mode of operation, the voltage of the battery may drop too much and the battery may not be able to sustain the operation of the device. On the other hand, if too little power is drawn from the battery during the enhanced mode of operation, the battery may be underutilized and the performance of the device may suffer adversely.

In some embodiments, an internal impedance of the battery may be a function of time, e.g., when relatively high power is being drawn from the battery. In some embodiments, variation of internal impedance of the battery may be estimated with respect to time during which relatively high power is being drawn from the battery. In some embodiments, high power or peak power that may be available for supply from the battery for the enhanced mode of operation may also be estimated, e.g., based on such estimated temporal variation of the internal impedance of the battery. In an example, such estimation of available peak power may ensure that the battery provides optimal or about optimal (or at least suboptimal) power during the enhanced mode of operation, thereby preventing too high or too little power being drawn from the battery. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 illustrates a device 100 that estimates peak power metrics based on estimating variation of internal impedance of a battery 104 powering the device, according to some embodiments. In some embodiments, the device 100 comprises the battery 104, which may at least in part power the device 100. In an example, the battery 104 may be intermittently recharged from an external power source, although such a power source is not illustrated in FIG. 1.

In some embodiments, the device 100 may be any appropriate device that may be, at least for a period of time, powered by the battery 104. For example, the device 100 may be a laptop, a cellular phone, a mobile phone, a smart phone, a camera, an Internet of Things (IoT), a wearable device, or any other appropriate computing device powered at least in part by a battery.

In some embodiments, the device 100 may comprise a fuel gauge 108 (also referred to herein as a battery fuel gauge). The fuel gauge 108 may monitor, estimate, and/or determine one or more parameters of the battery 104, e.g., may estimate an amount of charge remaining in the battery 104 (e.g., which may be a state of charge of the battery 104), estimate an internal impedance of the battery 104, monitor a battery usage history, estimate an amount of time the battery power can last assuming certain operating conditions, and/or the like.

In some embodiments, the device 100 comprises a Power Management Unit (PMU) 112 and/or a Power Management Integrated Circuit (PMIC) 116. The PMU 112 and/or the PMIC 116 may monitor various aspects of power management of the device 100. In some embodiments, the PMU 112 and/or the PMIC 116 may determine an amount of peak power that the battery 100 may supply for a short period of time, as discussed herein in further details.

In some embodiments, the device 100 may comprise one or more processors 120 (e.g., collectively referred to as processor 120), one or more memory 124, and one or more other components 128. In some embodiments, the memory 124 may store instructions that may be executed by the processor 120, e.g., to implement various functionality of the device 100. In some embodiments, the memory 124 may store information 126, where the information 126 may be associated with the internal impedance of the battery 104. Accordingly, the information 126 may also be referred to as impedance information. The components 128 may represent any other components present in the device 100, e.g., network interfaces, display, communication interfaces, charging circuitry for charging the battery 104, etc.

In some embodiments, the device 100 may comprise a battery impedance estimation circuitry 150 (also referred to herein as "circuitry 150"), which may estimate an internal impedance of the battery 104 (also referred to as impedance of the battery 104). In an example, the impedance of the battery 104 may vary with time, usage history, peak power delivered by the battery 104, duration of peak power delivered by the battery 104, state of charge of the battery 104, temperature, aging, capacity, voltage, etc., and the circuitry 150 may estimate the impedance of the battery 104 based on such factors, as will be discussed herein in further details.

In some embodiments, the device 100 may comprise a peak power estimation circuitry 154 (also referred to herein as "circuitry 154"), which may estimate an available peak power (or a plurality of available peak powers) that may be delivered by the battery 104 over a time period (or over a corresponding plurality of time periods), as will be discussed herein in further details.

In some embodiments, the circuitry 150 and/or the circuitry 154 may be implemented in (e.g., included in) an appropriate component of the device 100. Merely as an example, the circuitry 150 and/or the circuitry 154 may be included in the fuel gauge 108, the PMU 112, the PMIC 116, the processor 120, and/or other components 128. In some embodiments, at least some sections of the circuitry 150 and at least some section of the circuitry 154 may be combined as a single circuitry, or may be separated in multiple circuitries.

Figure 2:
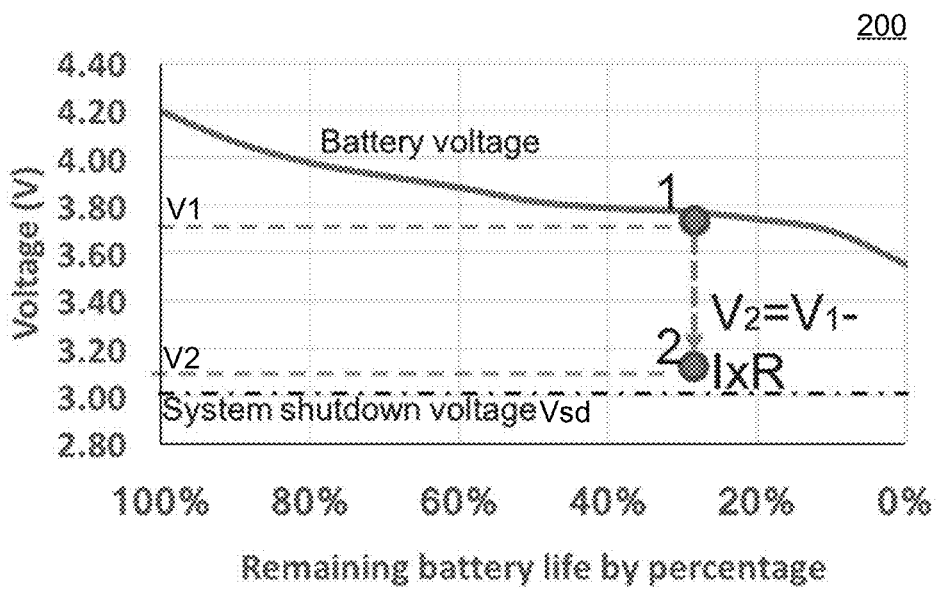
FIG. 2 illustrates a graph, with the X axis illustrating a remaining battery life (e.g., in percentage) and the Y axis illustrating the battery voltage in volts (V), according to some embodiments.

In an example, when the device 100 draws power from the battery 104, the voltage of the battery 104 may drop (e.g., due of Ohm's law, and due to internal impedance of the battery 104). For example, FIG. 2 illustrates a drop in the voltage of the battery 104 of the device 100 of FIG. 1, according to some embodiments. In FIG. 2, the circuitry 150 and/or 154 are assumed to be not operational, and the device 100 is assumed to operate as a conventional device.

FIG. 2 illustrates a graph 200, with the X axis illustrating a remaining battery life (e.g., in percentage) based on a charge of the battery, and the Y axis illustrating the battery voltage in volts (V), according to some embodiments. In FIG. 2, a voltage Vsd is assumed to be a system shutdown voltage (e.g., if the voltage of the battery 104 falls at or below this voltage, the device 100 may shut down due to under-voltage of the battery power supply). As illustrated, generally, with a decrease in the remaining charge in the battery, the voltage of the battery 104 may gradually decrease. At point 1, a sudden load is assumed to be imposed in the battery, due to which the battery voltage may decrease from voltage V1 to voltage V2 (e.g., transition from point 1 to point 2). For example, battery voltage may drop from V1 to V2 such that, for example:

$$V2=V1-I \cdot R, \qquad \text{Equation (1)}$$

where I maybe the current drawn from the battery, and R may be the battery internal impedance. In an example, current I may be calculated via I=P/Vbat, where P may be the system power drawn from the battery, and Vbat may be the battery voltage. In an example, to avoid sudden system shutdown, the voltage V2 has to be above the system shutdown voltage Vsd.

Referring again to FIG. 1, in some embodiments, the device 100 may operate in at least a regular mode of operation and an enhanced mode of operation. For example, in the regular mode, the device 100 may draw a regular amount of power (e.g., the power drawn from the battery 104 may be within a power bandwidth during the regular mode).

In some embodiments, in the enhanced mode of operation, higher power may be drawn from the battery. The enhanced mode of operation may also be referred to herein as a turbo boost mode of operation, where the processor 120 may operate at a higher voltage and/or a higher frequency, e.g., for a short period of time. Thus, during the enhanced mode of operation, peak power may be drawn from the battery, where the peak power may be drawn in short bursts, and the peak power may be higher than the regular power drawn during the regular mode of operation. In some embodiments, it may be useful to ensure that in the enhanced mode of operation, the peak power drawn from the battery 104 does not reduce the battery voltage to or below the system shutdown voltage Vsd.

In some embodiments and merely as an example, the fuel gauge 108 may report available power to the device 100 (e.g., to the PMIC 116, the PMU 112, the processor 120, and/or the like). In some embodiments, based on the available power from the battery, the device 100 (e.g., the processor 120) may enhance its performance by operating in the enhanced mode, without hitting system shutdown voltage, as discussed herein later in further details.

Figure 3:
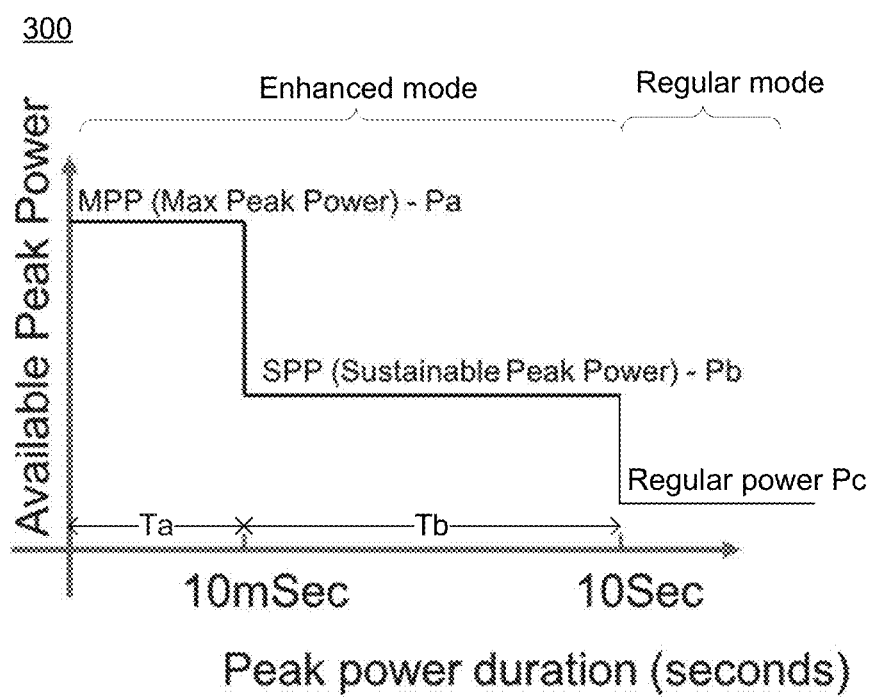
FIG. 3 illustrates a graph representing heuristic estimation of peak powers during an enhanced mode of operation of a device, according to some embodiments.

FIG. 3 illustrates a graph 300 representing heuristic estimation of peak powers during the enhanced mode of operation of the device 100, according to some embodiments. The graph 300 has an X axis representing durations of peak power that may be supplied by the battery 104, and the Y axis representing amounts of peak power that may be supplied by the battery 104.

The graph 300 assumes that the circuitry 150 and/or the circuitry 154 is not operational, and the device 104 operates in a conventional manner. For example, the graph 300 does not take into account temporal variation of the impedance of the battery 104 with time, while estimating the duration and/or amount of the peak powers.

In some embodiments, in the graph 300, power amount Pc may represent an average range of power consumed by the device 100, e.g., while the device operates in the regular mode of operation. When the device operates in the enhanced mode of operation, the device 100 may consume peak powers (e.g., power that may be higher than a threshold amount). For example, the device 100 may consume a maximum peak power of Pa for a time period Ta, where Ta may be about 10 milliseconds (ms) for example. The device 100 may then consume sustainable peak power Pb for a time period of about Tb, where Tb may be from 10 ms to about 10 seconds, as illustrated in FIG. 3. For example, when the device 100 is to operate in the enhanced mode, the fuel gauge 108 may report the peak powers Pa and Pb, and their corresponding respectively durations Ta and Tb, to the PMU 112, the PMIC 116, and/or the processor 120, based on which the device 100 may operate in the enhanced mode for the first 10 seconds. After that, the device 100 may operate in the regular mode of operation, and may consume power Pc.

In some embodiments, operating the device 100 beyond the peak powers Pa and/or Pb, or beyond the respective time periods Ta and Tb, may result in the voltage of the battery 104 being close to, or below, the system shut down voltage Vsd, which may jeopardize the operation of the device 100. So, in the example of the graph 300, the enhanced mode of operation of the device 100 may be limited by the parameters Pb, Pb, Tb, and Tb.

In some embodiments and in some scenarios, the battery 104 may be capable of supplying powers beyond the power limits Pa and/or Pb, and/or for time periods longer than Ta and/or Tb (e.g., without hitting the system shut down voltage Vsd), but such capability may not be reflected in the graph 300. Thus, this may represent underutilization of the battery 104, and/or under performance of the device 100.

Figure 4:
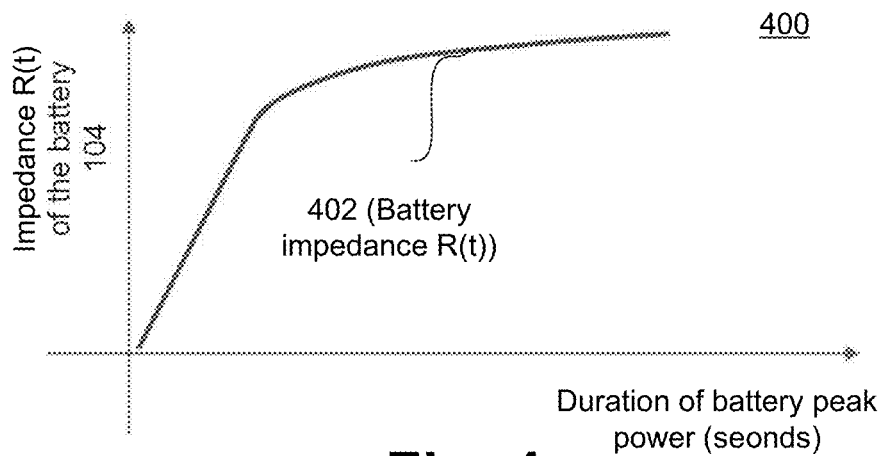
FIG. 4 illustrates a graph depicting an estimated variation of an impedance of a battery of the device of FIG. 1 with respect to a duration of battery peak power, according to some embodiments.

FIG. 4 illustrates a graph 400 depicting an estimated variation of an impedance R of the battery 104 of the device 100 of FIG. 1 with respect to a duration of battery peak power, according to some embodiments. The X axis of the graph 400 represents, in seconds, a duration of time the battery 104 supplies peak power, e.g., during the enhanced mode of operation. The Y axis represents the variation of the battery internal impedance R(t). In an example, the duration of battery peak power (e.g., the X axis of graph 400) may be a time duration for which the power supplied by the battery is higher than a threshold value (e.g. is continuously or at least intermittently higher than the threshold value).

A line 402 in the graph represents the variation of the battery internal impedance R(t) with respect to the duration of the battery peak power. For example, as illustrated in FIG. 4, the longer the battery 104 supplies peak power during the enhanced mode of the operation of the device, the impedance R of the battery 104 may increase further.

In some embodiments, in addition to the duration of time the battery 104 supplies peak power, there may be various other factors that may be taken into account while estimating the battery internal impedance R. For example, the impedance of the battery 104 may vary with usage history, amount of peak power delivered by the battery 104, state of charge of the battery 104, temperature, aging, capacity, voltage, etc. For example, generally, with a decrease in temperature, the impedance of the battery 104 may increase. In another example, with a decrease in the state of charge (e.g., charge level) of the battery 104, the impedance R may increase. In another example, as the battery 104 ages (e.g., measured in terms of months, or years), the battery impedance R may increase. In yet another example, as larger amount of peak power is delivered by the battery, the battery impedance R may increase.

In some embodiments, the battery internal impedance R(t) may be estimated by the circuitry 150 of FIG. 1. For example, if the circuitry 150 is included in the fuel gauge 108 (or the PMU 112), the impedance R(t) may be estimated by the fuel gauge 108 (or by the PMU 112).

In some embodiments, the circuitry 150 may take into account various factors in estimating the battery impedance R(t). For example, the circuitry 150 may be configured to access impedance information 126 from the memory 124, to access the fuel gauge 108 to get most relevant usage and/or state of charge information from the fuel gauge 108, and/or the like. Based on such information, the circuitry 150 may estimate the line 402.

For example, the impedance information 126 in the memory 124 may store a baseline relationship between the battery impedance and the duration of battery peak power. The circuitry 150 may modify or calibrate this baseline relationship based on, for example, new information received from the fuel gauge 108, the PMU 112, the PMIC 116, etc. For example, such new information may include state of charge of the battery 104, operating temperature, age of the battery, recent and long term usage history, amount of peak power delivered by the battery in the recent past, voltage of the battery 106, and/or the like. In some embodiments, based on modifying or calibrating the baseline relationship stored in the impedance information 126 in the memory 124, the circuitry 150 may estimate the battery impedance R(t) depicted in the line 402.

In some embodiments, the battery impedance R(t) may be measured from the past, and extrapolated in the future. In some embodiments, the circuitry 150 may estimate the battery impedance R(t) on a continuous basis. In some embodiments, the circuitry 150 may estimate the battery impedance R(t), e.g., when the device 100 is about to enter the enhanced mode of operation.

Figure 5:
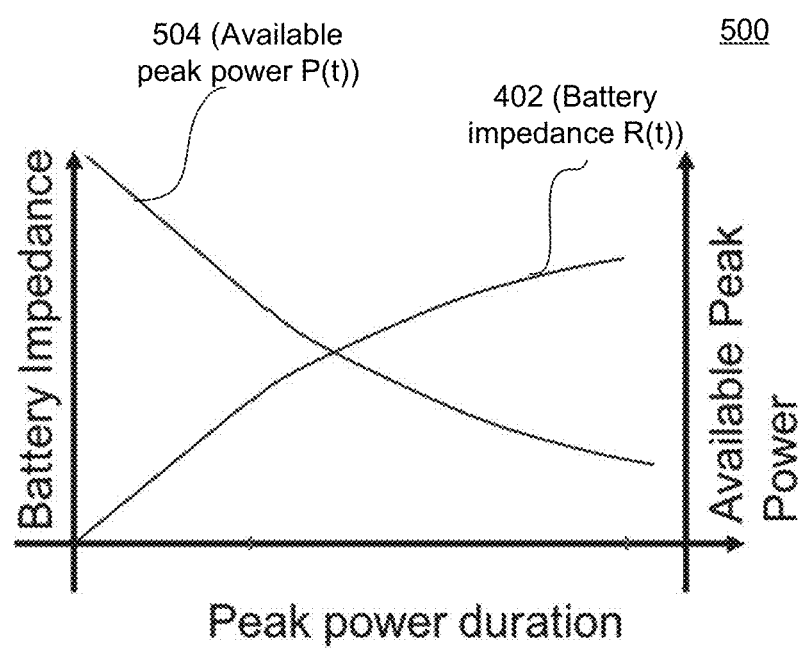
FIG. 5 illustrates a graph depicting an estimated variation of the impedance R(t) of a battery of a device and an estimated variation of available peak power P(t), versus a duration of battery peak power, according to some embodiments.

FIG. 5 illustrates a graph 500 depicting the estimated variation of the impedance R(t) of the battery 104 of the device 100 and an estimated variation of available peak power P(t), versus a duration of battery peak power, according to some embodiments. The X axis of the graph 500 represents, in seconds, the time during which the battery 104 supplies peak power, e.g., during the enhanced mode of operation of the device 100. There are two Y axes—the Y axis on the left represents the temporal variation of the battery internal impedance R(t), e.g., represented as a function of time. The Y axis on the right represents the temporal variation of available peak power P(t), e.g., represented as a function of time.

For example, the line 402 in the graph 500 corresponds to the left Y axis for the battery internal impedance R(t), and a line 504 in the graph 500 corresponds to the right Y axis for available peak power P(t). The line 402 for the battery impedance R(t) in the graphs 400 and 500 are similar.

In some embodiments, as the impedance R(t) increases with the peak power duration, the available peak power P(t) decreases. For example, when the device 100 is about to operate in the enhanced mode of operation, the circuitry 150 may estimate the internal impedance R(t) depicted by the line 402. Subsequently, the circuitry 154 may calculate the available peak power P(t) based on the internal impedance R(t), the shutdown voltage Vsd, and/or the like.

Merely as an example, the peak power P(t) may be determined based on the following equation:

$$Vsd < V_{current} - [P(t)/V_{after}] \cdot R(t), \quad \text{Equation (2)},$$

where Vsd maybe the shutdown voltage of the device 100 discussed with respect to FIG. 2, and $V_{current}$ may be the voltage of the battery 104 prior to the peak power being drawn from the battery 104. For example, $V_{current}$ may be an open circuit voltage of the battery 104, or voltage of the battery 104 under low current, prior to the peak power being drawn from the battery 104. Also, in equation 2, P(t) may be the available peak power of the line 504, and R(t) maybe the internal impedance depicted by the line 402. Also, $V_{after}$ may be the voltage of the battery after the IR drop (e.g., current times impedance) in the battery 104 due to the supply of the peak power.

Thus, in equation 2, Vsd may act as a threshold voltage that may be predefined, $V_{current}$ may be measured by the fuel gauge 108, R(t) may be estimated by the circuitry 150 (e.g., as discussed with respect to FIG. 4), and $V_{after}$ may be estimated based on the current battery voltage $V_{current}$ and an estimated IR drop in the battery 104 based on the power P(t) being drawn. Based on such factors, the circuitry 154 may estimate the peak power P(t), and generate the line 504 of the graph 500. Thus, in some embodiments, the circuitry 154 may estimate the available peak power P(k) as a function of battery impedance R(t), without violating the shutdown voltage Vsd.

Figure 6:
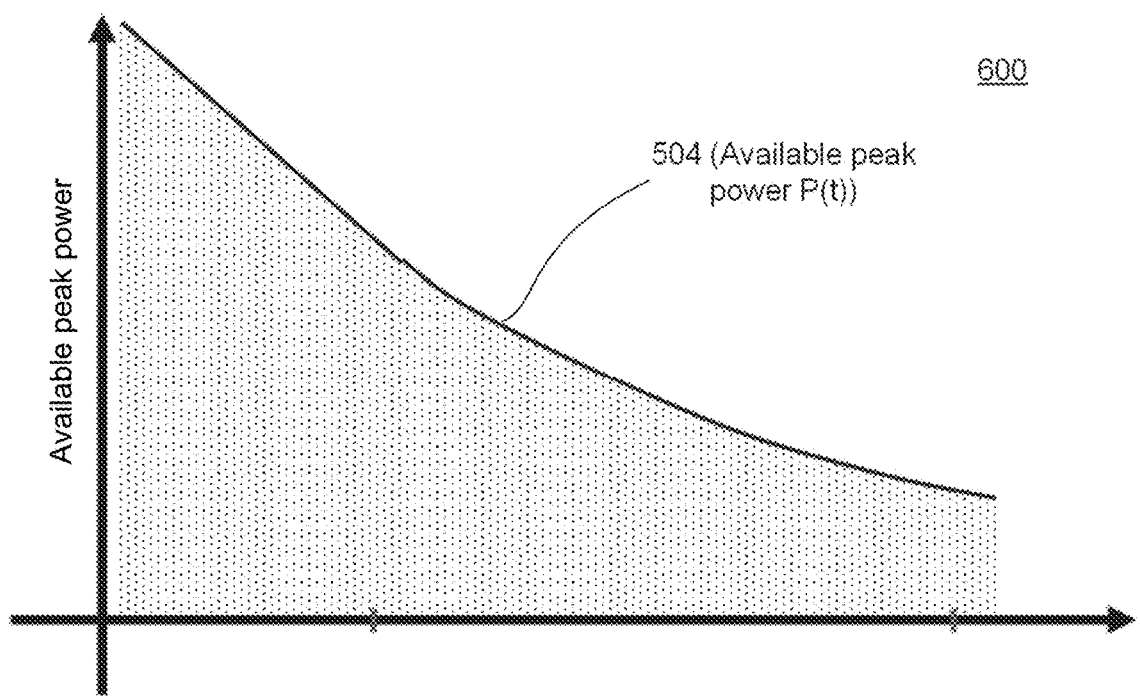
FIG. 6 illustrates a graph depicting an operating region of a device during an enhanced mode of operation of the device, according to some embodiments.

Referring again to FIG. 5, in some embodiments, while operating in the enhanced mode of operation, an upper limit of the available peak power from the battery 104 may be limited by the line 504. For example, the device 100 may operate underneath or on the line 504, but not over the line 504. For example, FIG. 6 illustrates a graph 600 depicting an operating region of the device 100 during an enhanced mode of operation of the device 100, according to some embodiments. The graph 600 is at least in part similar to the graph 500 of FIG. 5. For example, the graph 600 illustrates the line 504 of the graph 500. The graph 600 also illustrates, using dotted shadings, the area in which the device 100 may operate while in the enhanced mode of operation.

Figure 7:
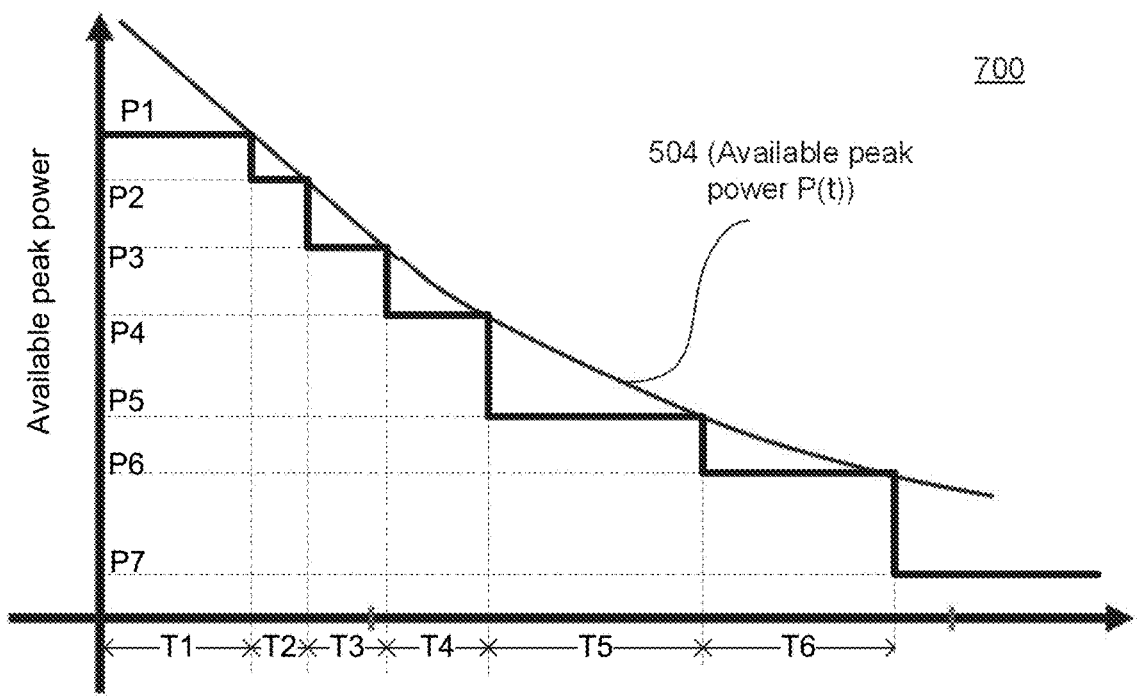
FIG. 7 illustrates another graph depicting the operating region of the device during the enhanced mode of operation of the device, according to some embodiments.

FIG. 7 illustrates another graph 700 depicting the operating region of the device 100 during the enhanced mode of operation of the device 100, according to some embodiments. The graph 700 is at least in part similar to the graphs 500 and 600 of FIGS. 5-6 (e.g., all the graphs have the same line 504, and same corresponding X and Y axis). Also, referring to the graph 700, for example, for a time period T1, the device 100 may safely draw peak power P1; for a time period T2, the device 100 may safely draw peak power P2; for a time period T6, the device 100 may safely draw peak power P6; and so on. The peak powers P1, . . . , P6 may be supplied by the battery 104, e.g., without reducing the battery voltage to the shutdown voltage Vsd, as discussed with respect to equation 2 herein before.

Thus, for example, if the battery 104 supplies the peak power P1 for at most the time duration T1, the battery voltage may reduce correspondingly, but may still be above the shutdown voltage Vsd. However, if the battery 104 supplies the peak power P1 for more than the time duration T1, the battery voltage may possibly reduce below the shutdown voltage Vsd, thereby jeopardizing the operation of the device 100. Thus, as discussed with respect to FIG. 6, the safe operating region of the device 100 may be underneath the line 504.

Although FIG. 7 illustrates, merely as an example, six discrete levels of available peak power during the enhanced mode of operation, such a number may be changed. For example, in an extreme situation, the peak power availed from the battery 104 may almost follow the line 504, which may maximize or optimize the peak power delivered by the battery 104. In such a case, the number of levels of peak power may be relatively high, which may be computationally intensive to implement in practice.

In some embodiments, the levels of the peak power, as illustrated in FIG. 7, may be estimated by the circuitry 154. Although FIG. 7 (and also FIGS. 5-6) are discussed with respect to available peak power P(t), in some embodiments, the circuitry 154 may report levels of available peak current (e.g., instead of, or in addition to, reporting levels of available peak power).

Figure 8:
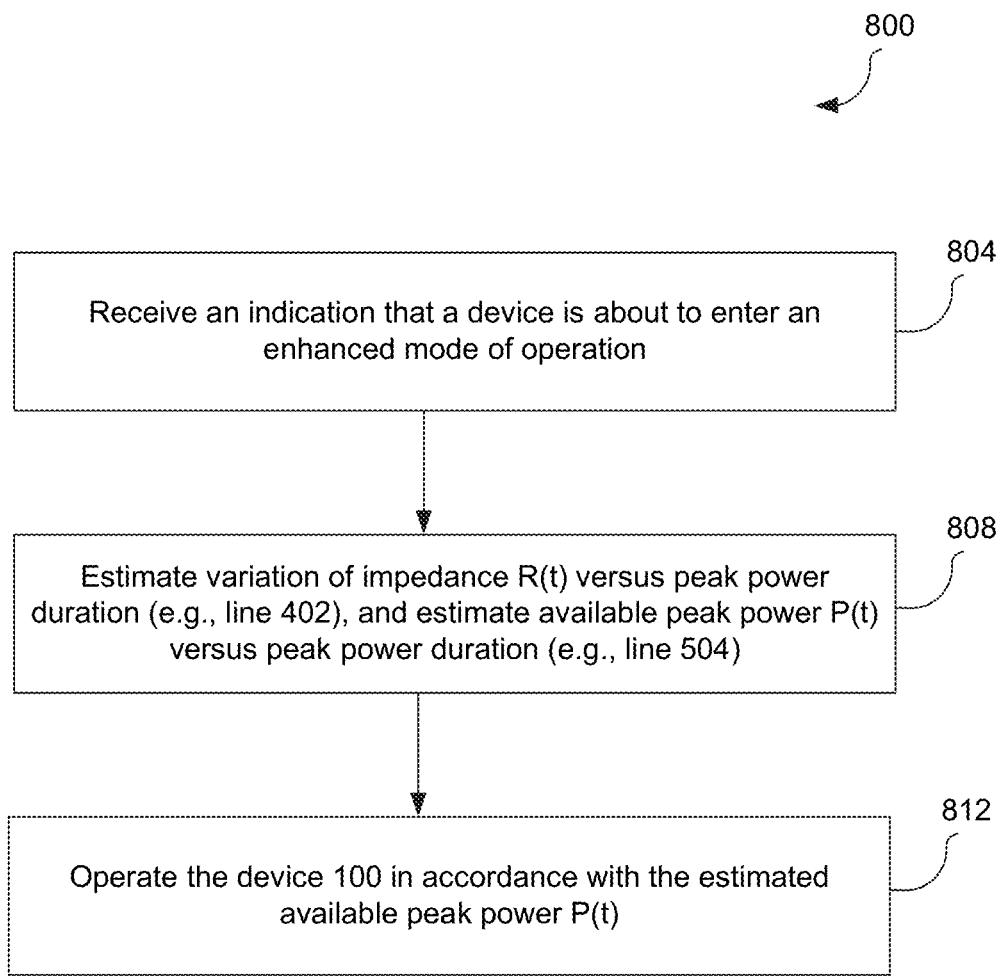
FIG. 8 illustrates a flowchart depicting a method for operating a device based on estimating available peak power, where the available peak power is estimated based on estimating a variation of impedance of a battery of the device, according to some embodiments.

FIG. 8 illustrates a flowchart depicting a method 800 for operating a device (e.g., device 100) based on estimating available peak power, where the available peak power is estimated based on estimating a variation of impedance of a battery (e.g., the battery 104) of the device, according to some embodiments. Although the blocks in the flowchart with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 may be optional in accordance with certain embodiments. The numbering of the blocks presented is for the sake of clarity and is not intended to prescribe an order of operations in which the various blocks must occur.

At 804, an indication that the device is about to enter an enhanced mode of operation may be received, e.g., by the circuitry 150 and/or the circuitry 154. As discussed herein previously, the enhanced mode of operation may be the turbo boost mode of operation.

At 808, variation of the impedance R(t) with respect to the peak power duration may be estimated, e.g., by the circuitry 150. For example, the line 402 may represent the temporal variation of the impedance R(t) with respect to the peak power duration. In some embodiments, also at 808, an available peak power P(t) variation with respect to the peak power duration may be estimated (e.g., by the circuitry 154). Although not illustrated in FIG. 8, the variation of the available peak power P(t) with respect to the peak power duration may be transmitted to, for example, the PMU 112, the PMIC 116, the processor 120, and/or any component of the device 100 that may control drawing of peak power from the battery 104.

In some embodiments, the estimation of the variation of the available peak power P(t) with respect to the peak power duration may be represented by the line 504. Additionally, or alternatively, the estimation of the variation of the available peak power P(t) with respect to the peak power duration may be represented by discrete peak power values and corresponding time periods (e.g., peak powers P1, . . . , P6, and corresponding respective time period T1, . . . , T6), as discussed with respect to FIG. 7.

At 812, the device 100 (e.g., the processor 120) may be operated (e.g., the processor may cause or facilitate the device 100 to operate) such that the device 100 draws the peak power in accordance with the estimated available peak power of 808.

In FIG. 8 (e.g., in blocks 804 and 808 of FIG. 8), an indication that the device is about to enter an enhanced mode of operation may be received, and subsequently, the variation of the impedance R(t) and available peak power may be estimated. However, in some embodiments, the estimation of the variation of the impedance R(t) and available peak power may be generated (e.g., by the fuel gauge 108 or by another component) on a periodic (or aperiodic) basis, intermittently, on a continuous or near continuous basis, and/or the like. In such embodiments and merely as an example, the operations of the block 804 may be redundant or optional. For example, the estimation at 808 may be performed independent of, or irrespective of, the indication at 804.

Figure 9:
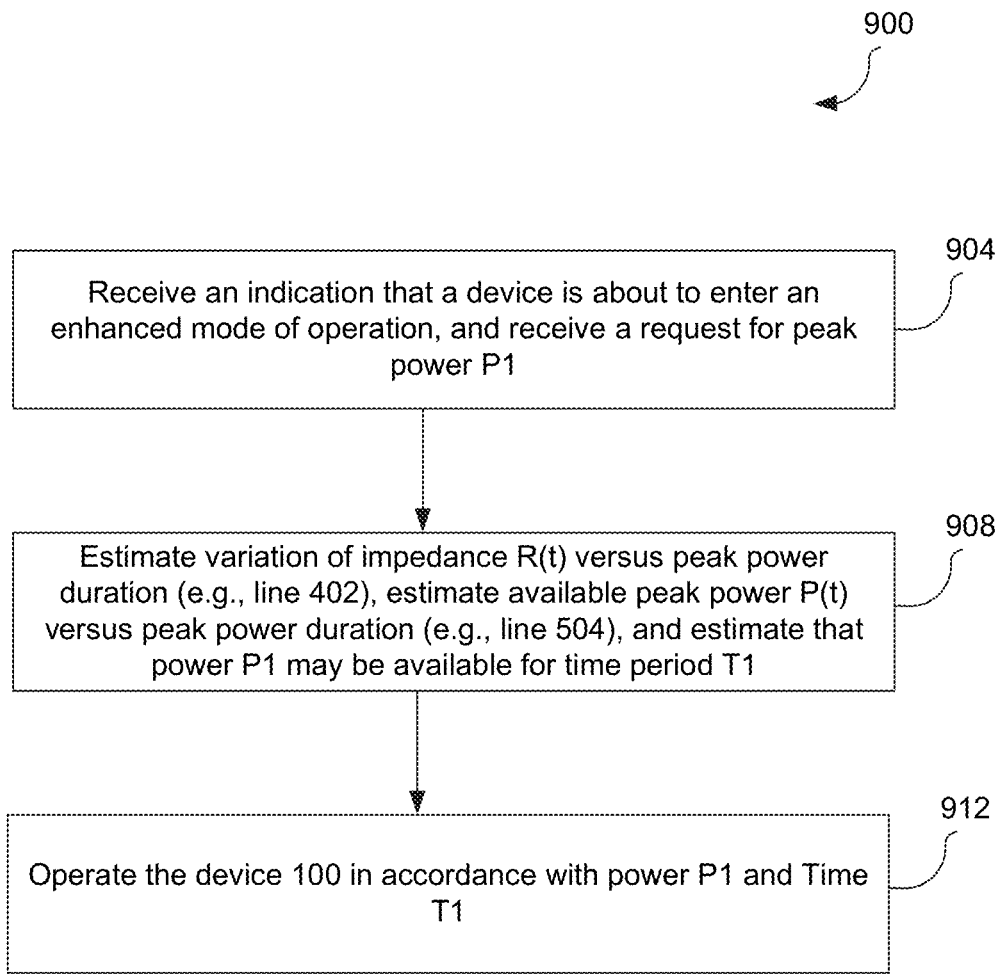
FIG. 9 illustrates a flowchart depicting a method for operating a device based on a specific peak power and a corresponding time period, where the peak power is estimated based on estimating a variation of impedance of a battery of the device, according to some embodiments.

Various variations of the method 800 may be possible, and FIG. 9 illustrates such an example variation. For example, FIG. 9 illustrates a flowchart depicting a method 900 for operating a device (e.g., device 100) based on a specific peak power and a corresponding time period, where the peak power is estimated based on estimating a variation of impedance of a battery (e.g., the battery 104) of the device, according to some embodiments. Although the blocks in the flowchart with reference to FIG. 9 are shown in a particular order, the order of the actions can be modified. Thus, the illustrated embodiments can be performed in a different order, and some actions/blocks may be performed in parallel. Some of the blocks and/or operations listed in FIG. 9 may be optional in accordance with certain embodiments. The numbering of the blocks presented is for the sake of clarity and is not intended to prescribe an order of operations in which the various blocks must occur.

At 904, an indication that the device is about to enter an enhanced mode of operation may be received, e.g., by the circuitry 150 and/or the circuitry 154. Also at 804, the circuitries 150 and/or 154 may receive an indication that the device 100 (e.g., the processor 120) wants to operate at a peak power level of P1.

At 908, variation of the impedance R(t) with respect to the peak power duration may be estimated, e.g., by the circuitry 150. In some embodiments, also at 908, an available peak power P(t) variation with respect to the peak power duration may be estimated (e.g., by the circuitry 154). Also, at 908, the peak power level of P1 may be mapped to the time period T1, based on the available peak power P(t) temporal variation, e.g., as discussed with respect to FIG. 7. Thus, at 908, the time period T1 may be estimated.

At 912, the device 100 (e.g., the processor 120) may be operated such that the device 100 draws the peak power P1 for at most a time period of T1.

In some embodiments and although not illustrated in FIG. 9, in addition to estimating the peak power P1/time period T1, the block 908 may also estimate that the device 100 can operate at peak power P2 for time period (T1+T2), or the device 100 can operate at peak power P6 for time period (T1+T2+ . . . +T6), and so on. Put differently, the circuitry 154 can estimate, at 908, any peak power/time period combination illustrated in FIG. 7 (or any peak power/time period combination that may be derived from the line 504, as discussed with respect to FIG. 7).

In FIG. 9 (e.g., in blocks 904 and 908 of FIG. 9), an indication that the device is about to enter an enhanced mode of operation may be received, and subsequently, the variation of the impedance R(t) and available peak power may be estimated. However, in some embodiments, the estimations at 908 may be generated (e.g., by the fuel gauge 108 or by another component) on a periodic (or aperiodic) basis, intermittently, on a continuous or near continuous basis, and/or the like. In such embodiments and merely as an example, the operations of the block 904 may be redundant or optional. For example, the estimation at 908 may be performed independent of, or irrespective of, the indication at 904.

Figure 10:
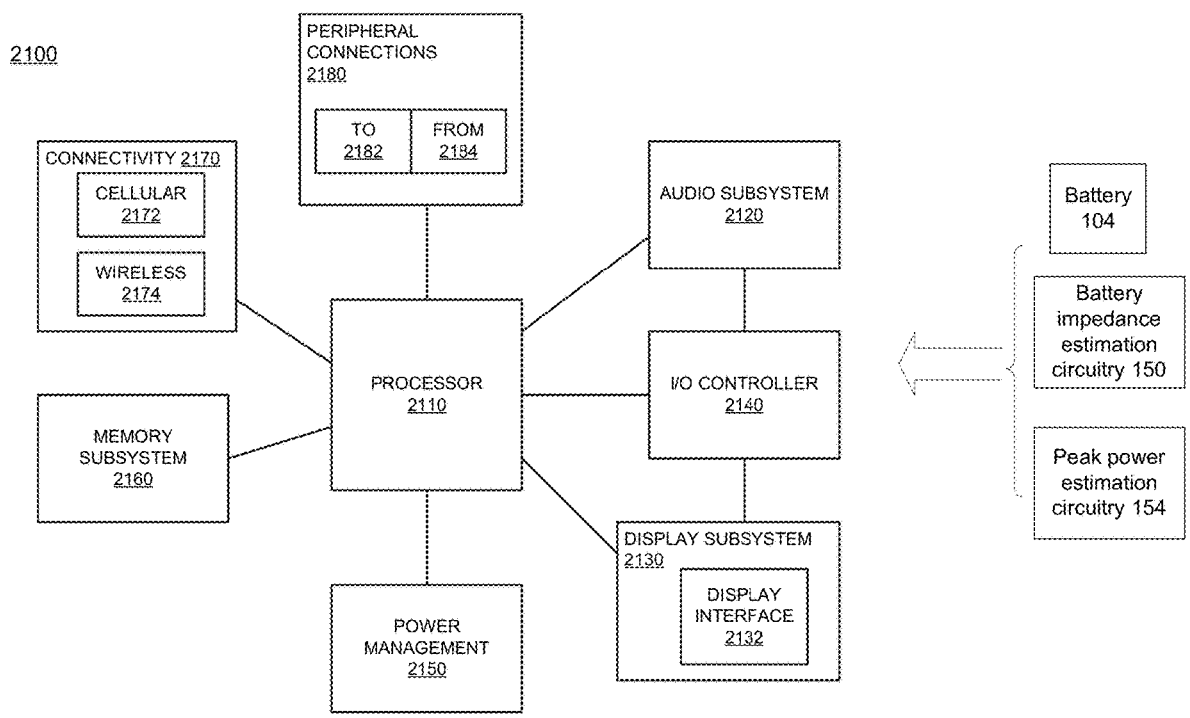
FIG. 10 illustrates a computing device, a smart device, a computing device or a computer system or a SoC (System-on-Chip), where the computing device may be operated at an enhanced mode based on estimating available peak power, where the available peak power is estimated based on estimating a variation of impedance of a battery of the computing device, according to some embodiments.

FIG. 10 illustrates a computing device 2100, a smart device, a computing device or a computer system or a SoC (System-on-Chip) 2100, where the computing device 2100 may be operated at an enhanced mode based on estimating available peak power, where the available peak power is estimated based on estimating a variation of internal impedance of a battery (e.g., the battery 104) of the computing device 2100, according to some embodiments. It is pointed out that those elements of FIG. 10 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise the battery 104, the circuitry 150, the circuitry 154, and/or various other components discussed with respect to FIG. 1, where the battery 104 may supply power to various components of the computing device 2100. In some embodiments, the computing device 2100 may operate based on estimating available peak power, where the available peak power is estimated based on estimating a variation of impedance of the battery of the computing device 2100, e.g., as discussed with respect to FIGS. 1-9.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a first circuitry to estimate variation of an internal impedance of a battery; a second circuitry to estimate a high power that the battery can supply for a first time-period, based on the estimated variation of the impedance of the battery; and a third circuitry to facilitate an operation of one or more components of the apparatus in accordance with the estimated high power for the first time-period.

Example 2

The apparatus of example 1 or any other example, wherein the third circuitry is to facilitate the operation in accordance with the estimated high power for the first time-period during an enhanced mode of operation of the apparatus.

Example 3

The apparatus of example 2 or any other example, wherein the enhanced mode of operation of the apparatus is a turbo boost mode of operation.

Example 4

The apparatus of example 1 or any other example, wherein the high power is a first high power, and wherein second circuitry is to: estimate a second high power and a third high power that the battery can respectively supply for a second time-period and a third time-period, based on the estimated variation of the impedance of the battery, wherein the third circuitry is to facilitate operation of the one or more components of the apparatus in accordance with the estimated second high power and the third high power for respectively the second time-period and the third time-period.

Example 5

The apparatus of example 1 or any other example, wherein the high power is a first high power, and wherein second circuitry is to: estimate a plurality of high powers that the battery can respectively supply for a plurality of time-periods, based on the estimated variation of the impedance of the battery, wherein the third circuitry is to facilitate operation of the one or more components of the apparatus in accordance with the estimated plurality of high powers for respectively the plurality of time-periods.

Example 6

The apparatus of any of examples 1-5 or any other example, wherein the first circuitry is to estimate the variation of the internal impedance of the battery with respect to a time during which power drawn from the battery is higher than a threshold value.

Example 7

The apparatus of any of examples 1-5 or any other example, wherein the first circuitry is to estimate the variation of the internal impedance of the battery, such that the internal impedance is a function of one of more of: a time during which power drawn from the battery is higher than a threshold value, a voltage of the battery prior to power being drawn from the battery, a history of usage of the battery, a temperature of the battery, an age of the battery, or a state of charge of the battery.

Example 8

The apparatus of any of examples 1-5 or any other example, wherein the first circuitry is included in a fuel gauge of the battery.

Example 9

A system comprising: a memory to store instructions; a processor coupled to the memory; a battery to supply power to the memory and the processor; a first circuitry to estimate temporal variation of an internal impedance of the battery; and a second circuitry to estimate a temporal variation of available peak power from the battery, based on the estimated temporal variation of the impedance of the battery, wherein the processor is to operate in an enhanced mode, based on the estimated temporal variation of the available peak power from the battery.

Example 10

The system of example 9 or any other example, wherein the second circuitry is to: estimate a plurality of peak powers that the battery can respectively supply for a plurality of time-periods, based on the estimated temporal variation of the available peak power from the battery.

Example 11

The system of example 10 or any other example, wherein: the processor is to operate in the enhanced mode such that one or more of the plurality of peak powers are drawn from the battery for a corresponding one or more of the plurality of time-periods.

Example 12

The system of any of examples 9-11 or any other example, wherein the enhanced mode of operation is a turbo boost mode of operation.

Example 13

The system of any of examples 9-11 or any other example, wherein the first circuitry is to estimate the temporal variation of the internal impedance of the battery with respect to time for which power drawn from the battery is higher than a threshold value.

Example 14

The system of any of examples 9-11 or any other example, wherein the first circuitry is to estimate the temporal variation of the internal impedance of the battery, such that the internal impedance is a function of one of more of: a time during which power drawn from the battery is higher than a threshold value, a temperature of the battery, an age of the battery, a voltage of the battery prior to the power being drawn from the battery, a history of usage of the battery, or a state of charge of the battery.

Example 15

The system of any of examples 9-11 or any other example, wherein the memory is to store information, based on which the first circuitry is to estimate the temporal variation of the internal impedance of the battery.

Example 16

Non-transitory computer-readable storage media to store instructions that, when executed by a processor, cause the processor to: estimate variation of an impedance of a battery with time; estimate a first power that the battery can supply for a first time-period, based on the estimated variation of the impedance of the battery with time; and facilitate operation of one or more components in accordance with the estimated first power for the first time-period.

Example 17

The non-transitory computer-readable storage media of example 16 or any other example, wherein the instructions cause the processor to: estimate a second power and a third power that the battery can respectively supply for a second time-period and a third time-period, based on the estimated variation of the impedance of the battery with time; and facilitate operation of the one or more components in accordance with the first power, the second power, and the third power for the first time-period, the second time-period, and the third time-period, respectively.

Example 18

The non-transitory computer-readable storage media of example 16 or any other example, wherein the one or more components are to operate in accordance with the estimated first power for the first time-period during a turbo boost mode of operation.

Example 19

The non-transitory computer-readable storage media of any of examples 16-18 or any other example, wherein the variation of the impedance of the battery is estimated with respect to the time during which power drawn from the battery is higher than a threshold value.

Example 20

The non-transitory computer-readable storage media of any of examples 16-18 or any other example, wherein the variation of the impedance of the battery is estimated to be a function of one of more of: a time during which power drawn from the battery is higher than a threshold value, a voltage of the battery prior to power being drawn from the battery, a history of usage of the battery, a temperature of the battery, an age of the battery, or a state of charge of the battery.

Example 21

A method comprising: estimating variation of an impedance of a battery with time; estimating a first power that the battery can supply for a first time-period, based on the estimated variation of the impedance of the battery with time; and facilitating operation of one or more components in accordance with the estimated first power for the first time-period.

Example 22

The method of example 21 or any other example, further comprising: estimating a second power and a third power that the battery can respectively supply for a second time-period and a third time-period, based on the estimated variation of the impedance of the battery with time; and facilitating operation of the one or more components in accordance with the first power, the second power, and the third power for the first time-period, the second time-period, and the third time-period, respectively.

Example 23

The method of example 21 or any other example, wherein the one or more components are to operate in accordance with the estimated first power for the first time-period during a turbo boost mode of operation.

Example 24

The method of any of examples 21-23 or any other example, wherein the variation of the impedance of the battery is estimated with respect to the time during which power drawn from the battery is higher than a threshold value.

Example 25

The method of any of examples 21-23 or any other example, wherein the variation of the impedance of the battery is estimated to be a function of one of more of: a time during which power drawn from the battery is higher than a threshold value, a voltage of the battery prior to power being drawn from the battery, a history of usage of the battery, a temperature of the battery, an age of the battery, or a state of charge of the battery.

Example 26

One or more non-transitory computer-readable storage media to store instructions that, when executed by a processor, cause the processor to execute a method of any of the examples 21-25 or any other example.

Example 27

An apparatus comprising: means for performing the method of any of the examples 21-25 or any other example.

Example 28

An apparatus comprising: means for estimating variation of an impedance of a battery with time; means for estimating a first power that the battery can supply for a first time-period, based on the estimated variation of the impedance of the battery with time; and means for facilitating operation of one or more components in accordance with the estimated first power for the first time-period.

Example 29

The apparatus of example 28 or any other example, further comprising: means for estimating a second power and a third power that the battery can respectively supply for a second time-period and a third time-period, based on the estimated variation of the impedance of the battery with time; and means for facilitating operation of the one or more components in accordance with the first power, the second power, and the third power for the first time-period, the second time-period, and the third time-period, respectively.

Example 30

The apparatus of example 28 or any other example, wherein the one or more components are to operate in accordance with the estimated first power for the first time-period during a turbo boost mode of operation.

Example 31

The apparatus of any of examples 28-30 or any other example, wherein the variation of the impedance of the battery is estimated with respect to the time during which power drawn from the battery is higher than a threshold value.

Example 32

The apparatus of any of examples 28-30 or any other example, wherein the variation of the impedance of the battery is estimated to be a function of one of more of: a time during which power drawn from the battery is higher than a threshold value, a voltage of the battery prior to power being drawn from the battery, a history of usage of the battery, a temperature of the battery, an age of the battery, or a state of charge of the battery.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first circuitry to estimate variation of an internal impedance of a battery;
a second circuitry to estimate a high power that the battery can supply for a first time-period, based on the estimated variation of the impedance of the battery; and
a third circuitry to facilitate an operation of one or more components of the apparatus in accordance with the estimated high power for the first time-period.

2. The apparatus of claim 1, wherein the third circuitry is to facilitate the operation in accordance with the estimated high power for the first time-period during an enhanced mode of operation of the apparatus.

3. The apparatus of claim 2, wherein the enhanced mode of operation of the apparatus is a turbo boost mode of operation.

4. The apparatus of claim 1, wherein the high power is a first high power, and wherein second circuitry is to:
estimate a second high power and a third high power that the battery can respectively supply for a second time-period and a third time-period, based on the estimated variation of the impedance of the battery,
wherein the third circuitry is to facilitate operation of the one or more components of the apparatus in accordance with the estimated second high power and the third high power for respectively the second time-period and the third time-period.

5. The apparatus of claim 1, wherein the high power is a first high power, and wherein second circuitry is to:

estimate a plurality of high powers that the battery can respectively supply for a plurality of time-periods, based on the estimated variation of the impedance of the battery, wherein the third circuitry is to facilitate operation of the one or more components of the apparatus in accordance with the estimated plurality of high powers for respectively the plurality of time-periods.

6. The apparatus of claim 1, wherein the first circuitry is to estimate the variation of the internal impedance of the battery with respect to a time during which power drawn from the battery is higher than a threshold value.

7. The apparatus of claim 1, wherein the first circuitry is to estimate the variation of the internal impedance of the battery, such that the internal impedance is a function of one of more of: a time during which power drawn from the battery is higher than a threshold value, a voltage of the battery prior to power being drawn from the battery, a history of usage of the battery, a temperature of the battery, an age of the battery, or a state of charge of the battery.

8. The apparatus of claim 1, wherein the first circuitry is included in a fuel gauge of the battery.

9. A system comprising:
a memory to store instructions;
a processor coupled to the memory;
a battery to supply power to the memory and the processor;
a first circuitry to estimate temporal variation of an internal impedance of the battery; and
a second circuitry to estimate a temporal variation of available peak power from the battery, based on the estimated temporal variation of the impedance of the battery,
wherein the processor is to operate in an enhanced mode, based on the estimated temporal variation of the available peak power from the battery.

10. The system of claim 9, wherein the second circuitry is to:
estimate a plurality of peak powers that the battery can respectively supply for a plurality of time-periods, based on the estimated temporal variation of the available peak power from the battery.

11. The system of claim 10, wherein:
the processor is to operate in the enhanced mode such that one or more of the plurality of peak powers are drawn from the battery for a corresponding one or more of the plurality of time-periods.

12. The system of claim 9, wherein the enhanced mode of operation is a turbo boost mode of operation.

13. The system of claim 9, wherein the first circuitry is to estimate the temporal variation of the internal impedance of the battery with respect to time for which power drawn from the battery is higher than a threshold value.

14. The system of claim 9, wherein the first circuitry is to estimate the temporal variation of the internal impedance of the battery, such that the internal impedance is a function of one of more of: a time during which power drawn from the battery is higher than a threshold value, a temperature of the battery, an age of the battery, a voltage of the battery prior to the power being drawn from the battery, a history of usage of the battery, or a state of charge of the battery.

15. The system of claim 9, wherein the memory is to store information, based on which the first circuitry is to estimate the temporal variation of the internal impedance of the battery.

16. Non-transitory computer-readable storage media to store instructions that, when executed by a processor, cause the processor to:
estimate variation of an impedance of a battery with time;
estimate a power that the battery can supply for a time-period, based on the estimated variation of the impedance of the battery with time; and
facilitate operation of one or more components in accordance with the estimated power for the time-period,
wherein the one or more components are to operate in accordance with the estimated power for the time-period during a turbo boost mode or enhanced mode of operation.

17. The non-transitory computer-readable storage media of claim 16, wherein the estimated power is an estimated first power, wherein the power is the first power, wherein the time-period is a first time-period, wherein the instructions cause the processor to:
estimate a second power and a third power that the battery can respectively supply for a second time-period and a third time-period, based on the estimated variation of the impedance of the battery with time; and
facilitate operation of the one or more components in accordance with the first power, the second power, and the third power for the first time-period, the second time-period, and the third time-period, respectively.

18. The non-transitory computer-readable storage media of claim 16, wherein the variation of the impedance of the battery is estimated with respect to the time during which power drawn from the battery is higher than a threshold value.

19. The non-transitory computer-readable storage media of claim 16, wherein the variation of the impedance of the battery is estimated to be a function of one of more of: a time during which power drawn from the battery is higher than a threshold value, a voltage of the battery prior to power being drawn from the battery, a history of usage of the battery, a temperature of the battery, an age of the battery, or a state of charge of the battery.

20. An apparatus comprising:
a battery;
a memory to store information associated with an impedance of the battery; and
a fuel gauge coupled to the battery, wherein the fuel gauge includes:
a first circuitry to estimate variation of the impedance of the battery, wherein the fuel gauge accesses the impedance of the battery from the memory; and
a second circuitry to estimate a power that the battery can supply for a time-period, based on the estimated variation of the impedance of the battery.

21. The apparatus of claim 20 comprising a power management unit (PMU) coupled to the memory and the fuel gauge, wherein the fuel gauge reports to the PMU available power to the apparatus.

22. The apparatus of claim 20, wherein the fuel gauge is to modify or calibrate a relationship between the accessed impedance of the battery and the power the battery can supply for the time-period.

23. The apparatus of claim 20 comprising a third circuitry to facilitate an operation of one or more components of the apparatus in accordance with the estimated power for the time-period.

24. The apparatus of claim 20 comprising a processor coupled to the memory and powered by the battery, wherein the processor is operate in an enhanced mode, based on the estimated variation of the of the impedance of the battery.

\* \* \* \* \*